United States Patent [19]

Kojima et al.

[11] Patent Number: 4,681,672
[45] Date of Patent: Jul. 21, 1987

[54] METHOD FOR ETCHING ELECTRODE FOILS FOR AN ALUMINIUM ELECTROLYTIC CAPACITOR

[75] Inventors: Koichi Kojima; Akihiro Jujo, both of Osaka; Masanori Okabayashi, Kyoto; Ryoichi Shimatani, Kyoto; Kenji Toyama, Kyoto; Nobuyoshi Kanzaki, Kyoto, all of Japan

[73] Assignee: Matsushita Electric Industrial Co., Ltd., Japan

[21] Appl. No.: 813,861

[22] Filed: Dec. 27, 1985

[30] Foreign Application Priority Data

Dec. 28, 1984 [JP] Japan .................. 59-280380

[51] Int. Cl.$^4$ .............................................. C25F 3/04
[52] U.S. Cl. ........................... 204/129.4; 204/129.43; 204/DIG. 9
[58] Field of Search ............... 204/33, 129.4, 129.43, 204/DIG. 9

[56] References Cited

U.S. PATENT DOCUMENTS

| | | | |
|---|---|---|---|
| 3,294,666 | 12/1966 | Wiersma | 204/228 |
| 4,294,672 | 10/1981 | Ohba et al. | 204/129.4 |
| 4,297,184 | 10/1981 | Dyer | 204/129.4 |
| 4,315,806 | 2/1982 | Arora | 204/129.4 |
| 4,533,444 | 8/1985 | Oda et al. | 204/129.43 |
| 4,545,875 | 10/1985 | Riley | 204/129.4 |

FOREIGN PATENT DOCUMENTS 58-22390  2/1983  Japan .

Primary Examiner—John F. Niebling
Assistant Examiner—William T. Leader
Attorney, Agent, or Firm—Lowe, Price, LeBlanc, Becker & Shur

[57] ABSTRACT

A method for electrolytically etching an aluminium foil for use as an electrode of an aluminium electrolytic capacitor is described. In the method, an aluminium foil is electrolytically etched an on the surfaces thereof in a 3 to 25% hydrochloric acid solution containing aluminium chloride by application of an AC current. The AC current has a waveform, each cycle of which consists of positive and negative half cycles and an OFF time interval between the respective half cycles at which the AC current becomes zero whereby the size of pits formed by the etching is suitably controlled.

2 Claims, 6 Drawing Figures

FIG. 1a
(PRIOR ART)
FIG. 1b
(PRIOR ART)
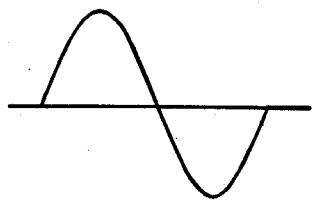
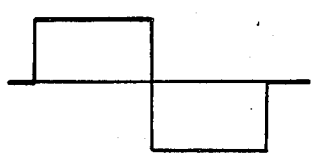
FIG. 2a
FIG. 2b
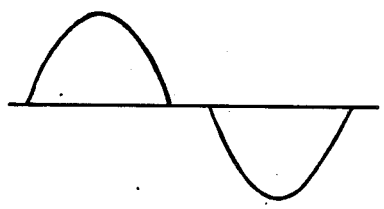
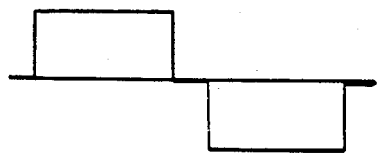
FIG. 4
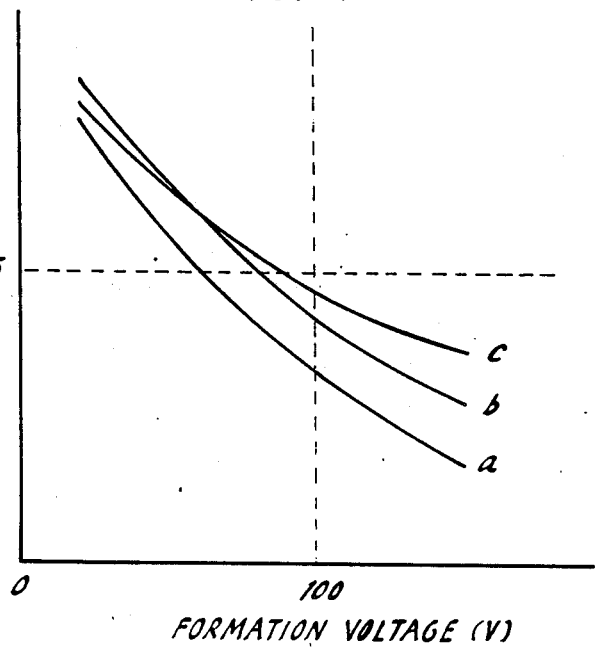

METHOD FOR ETCHING ELECTRODE FOILS FOR AN ALUMINIUM ELECTROLYTIC CAPACITOR

Background Of The Invention

1. Field of the Invention

This invention relates to a method for etching an electrode foil for aluminium electrolytic capacitors.

2. Description of the Prior Art

As is well known in the art, aluminium electrolytic capacitors are fabricated by convolutely winding aluminium electrode foils and an insulative paper intervening between the foils and dipping the winding in an electrolytic solution. In order to increase an electrostatic capacitance per unit area of the electrode foil, the foil used is etched to form pits on the surfaces thereof so as to increase the surface area.

A recent development of IC, LSI and the like demands electrolytic capacitors which are smaller and thinner in size. This in turn requires an increasing electrostatic capacitance per unit area of the electrode foil.

In a known method of etching electrode foils for use in aluminium electrolytic capacitors, an AC current having a sine or rectangular waveform as shown in FIG. 1a or 1b is used for etching while making use of the high strength of the aluminium foil. This is described, for example, in Japanese Laid-open Patent Application No. 58-22390.

With known waveforms such as the sine wave, rectangular wave and the like in which no OFF time exists, it is difficult to control, by etching, an optimum pit diameter (i.e. a diameter of irregularities caused by etching) which varies according to the formation voltage. For providing further miniaturization of aluminium electrolytic capacitors, the known method is disadvantageous in that a ratio of an electrostatic capacitance per unit area of electrode foil after etching to an electrostatic capacitance per unit area of electrode foil before etching is unsatisfactory. This ratio may be hereinafter referred to simply as "capacitance ratio".

SUMMARY OF THE INVENTION

It is accordingly an object of the invention to provide a method for etching an aluminium foil for use in aluminium electrolytic capacitors whereby the surface area is increased over the prior art case.

It is another object of the invention to provide a method for etching an aluminium foil in which the foil is more efficiently etched and thus has a much improved electrostatic capacitance per unit area.

It is a further object of the invention to provide a method for etching an aluminium foil to ensure a larger surface area than prior art methods, so that an aluminium electrolytic capacitor can be suitably miniaturized and can be fabricated at a lower cost.

The invention provides a method which comprises electrolytically etching an aluminium foil on the surfaces thereof in a 3 to 25% hydrochloric acid solution containing aluminium chloride at a temperature of 20° to 60° C. by application of an AC current. The present invention is characterized by the waveform of the AC current which consists of positive and negative half cycles and an interval between the respective half cycles at which the AC current becomes zero.

More specifically and, in fact, preferably, the method comprises placing an aluminium foil between and in parallel to equally spaced electrodes in the electrolytic solution and applying an AC current across the spaced electrodes without direct application to the aluminium foil for etching in which the current waveform of the respective positive and negative half cycles are identical with respect to the intervals and peak height.

It will be noted that an interval between the respective positive and negative half cycles at which the etching current becomes zero may be hereinafter referred to simply as OFF time. On the other hand, an interval or half cycle in which the etching current is passed may be simply referred to as ON time.

The OFF time at which the etching current becomes zero is preferably in the range of 2 to 30 msec. The ON time at which the etching current is passed through the electrolytic solution is preferably in the range of from 10 to 100 msec.

The current waveform during the ON time in the respective half cycles may be a sine wave, rectangular wave and trapezoidal wave with or without ripples.

BRIEF DESCRIPTION OF THE DRAWINGS

FIGS. 1a and 1b are, respectively, sine and rectangular waveforms of an etching current used in a known etching method;

FIGS. 2a and 2b are, respectively, sine and rectangular waveforms of an etching current including OFF time intervals according to the invention;

FIG. 4 is a graphical representation of the relation between formation voltage and electrostatic capacitance for different OFF time intervals.

DETAILED DESCRIPTION AND EMBODIMENTS OF THE INVENTION

Figure 3:
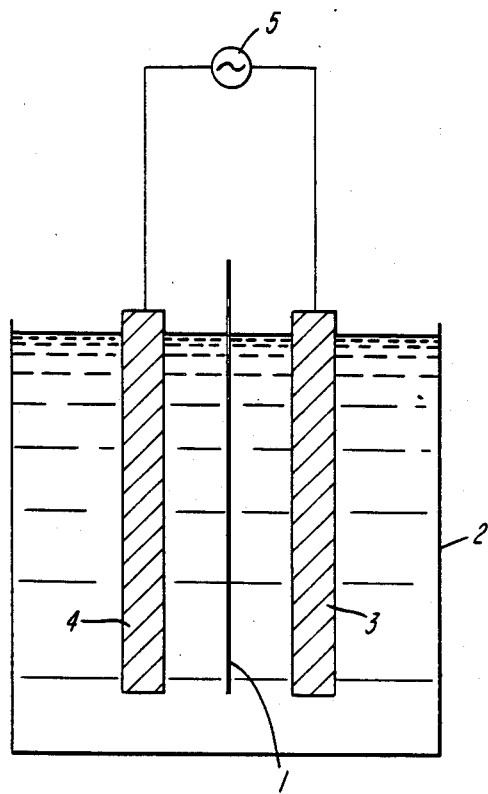
FIG. 3 is a schematic diagram of an apparatus for use in the method of the present invention.

According to the method of the invention, an aluminium foil is electrolytically etched in a hydrochloric acid solution containing aluminium chloride at a temperature of the solution of 20° to 60° C. The hydrochloric acid solution has an HCl concentration of 3 to 25%. Aluminium chloride is generally used in an amount of 1 to 10% by weight of the solution.

In the practice of the invention, an AC current is used and applied for the etching. The AC current should have a waveform wherein one complete cycle consists of positive and negative half cycles and an interval between the half cycles at which the AC current becomes zero.

When the etching of an aluminium foil is conducted using the AC current as described above, fine irregularities or pits are formed on the surfaces of the aluminium foil during the ON time intervals. However, the etching or chemical corrosion, which proceeds in the hydrochloric acid solution, can be suitably controlled by controlling the length of each OFF time interval during which no etching current is passed. Thus, it becomes possible to make an optimum pit diameter according to the formation voltage. The resultant aluminium foil has an increasing capacitance ratio.

For the optimum electrolytic etching, it is necessary to optimumly control the chemical corrosion which proceeds in the hydrochloric solution during the OFF time, in accordance with the distribution and size of the individual pits formed by chemical etching during the ON time. In other words, the ON and OFF times have an optimum relation in order to form a desired pit diameter. For instance, if the OFF time is increased too much, the pit diameter becomes too large, leading to a lowering of electrostatic capacitance.

According to our experiment, it has been found that the individual OFF time at which the etching current is maintained at zero is in the range of from 2 to 30 msec., and the ON time is in the range of from 10 to 100 msec.

The current during the ON time in complete cycles may be in the form of a sine, rectangular and trapezoidal wave with or without ripples. In FIGS. 2a and 2b, there are, respectively, shown sine and rectangular waveforms including an OFF time between the half cycles.

Preferably, the etching is effected as shown in FIG. 3 in such a way that the aluminium foil 1 is placed in the hydrochloric acid solution bath 2 between and in parallel to a pair of equally spaced electrodes 3, 4 and the AC current from a power source 5 is applied across the paired electrodes without direct application of the current to the aluminium foil. This is very suitable for the production of a uniformly etched aluminium foil and contributes to reduce troubles such as breakage of the foil and formation of defects on the foil as will be produced by direct application of the current to the foil. As a matter of course, the etching may be effected continuously or in a batchwise manner.

The present invention is more particularly described by way of example. EXAMPLE

Aluminium foils were etched in a hydrochloric acid solution under the following conditions.

Etching solution: 5% HCl solution containing 2% AlCl$_3$

Aluminium foil: 4N O Al material having a purity of 99.99% and softened by annealing Etching temperature (solution temp.): 40° C.

Etching time: 5 minutes

Etching current waveform: sine wave of an ON time of 50 ms and an OFF time of (a) nil, (b) 10 ms. or (c) 20 ms.

The relationship between formation voltage and electrostatic capacitance of each etched aluminium foil is shown in FIG. 4. As will be seen from curves a, b and c of the figure, the electrostatic capacitance attained by etching using the waveforms (b) and (c) having off times according to the invention is higher by 20 to 100% than in the case of the known waveform (a) which is free of any OFF time. A longer OFF time results in a larger pit diameter, so that the difference in electrostatic capacitance between the invention and the prior art becomes more significant at a higher formation voltage.

In the above example, the etching solution was a 5% hydrochloric acid solution and similar results were obtained when the concentration of HCl was in the range of 3 to 25%. Also, similar results were obtained when the concentration of aluminium chloride was in the range of 1 to 10% by weight.

When using an aluminium foil having a higher capacitance ratio, aluminium electrolytic capacitors can be beneficially miniaturized with a reduced cost.

What is claimed:

1. A method for electrolytically etching an aluminum foil for use as an electrode of an aluminum electrolytic capacitor, which comprises arranging the aluminum foil between and in parallel to a pair of equally spaced electrodes in a 3 to 25% hydrochloric acid solution containing aluminum chloride at a temperature of from 20 to 60 degrees C., and electrolytically etching the aluminum foil on the surfaces thereof by application of an AC current across the paired electrodes without direct application to the aluminum foil to etch the foil, said AC current having a waveform in which each cycle consists of positive and negative half cycles and an OFF time interval between the half cycles at which the AC current is zero, the current waveforms in the positive and negative half cycles being identical, the interval of each half cycle being in the range of from 10, to 100 msec and each OFF time interval at which the etching current is zero being in the range of from 2 to 30 msec, whereby the size of pits formed by the etching may be suitably controlled.

2. A method according to claim 1, wherein the waveform during the half cycles is in the form of a sine, rectangular or trapezoidal wave with or without ripples.

* * * * *